United States Patent [19]

Brandquist

[11] 3,842,340

[45] Oct. 15, 1974

[54] GENERATOR FOR PRODUCING ULTRASONIC OSCILLATIONS

[75] Inventor: Rune Lennart Brandquist, Vaestra, Sweden

[73] Assignee: U.S. Phillips Corporation, New York, N.Y.

[22] Filed: Feb. 16, 1970

[21] Appl. No.: 11,674

[30] Foreign Application Priority Data

Feb. 20, 1969 Sweden .............................. 2321/69

[52] U.S. Cl. ................. 321/45 R, 310/8.1, 318/116

[51] Int. Cl. ....... H02m 7/00, H01v 7/00, H02b 9/00

[58] Field of Search ....... 310/8.1; 321/2, 18, 43–45; 134/1; 318/116; 331/9

[56] References Cited

UNITED STATES PATENTS

| | | | |
|---|---|---|---|
| 2,805,334 | 9/1957 | Cayzac | 331/9 |
| 3,129,366 | 4/1964 | Fry | 318/116 X |
| 3,293,456 | 12/1966 | Shoh | 310/8.1 |
| 3,413,539 | 11/1968 | Lopitzsch | 321/45 |
| 3,447,051 | 5/1969 | Attwood et al. | 318/116 X |
| 3,460,025 | 8/1969 | Deprisco | 321/45 |
| 3,501,685 | 3/1970 | Reese et al. | 321/18 X |

FOREIGN PATENTS OR APPLICATIONS

| | | | |
|---|---|---|---|
| 207,538 | 10/1955 | Australia | 331/9 |

*Primary Examiner*—William H. Beha, Jr.
*Attorney, Agent, or Firm*—Frank R. Trifari; Bernard Franzblau

[57] ABSTRACT

An ultrasonic generator with means for automatically adjusting the oscillation frequency to provide maximum power to the load. The generator includes a DC-AC converter operating into a resonant circuit that is coupled to the transducer. The converter includes first and second switching devices alternately switched by the frequency modulated output of a frequency controllable oscillator. The modulation frequency is derived across a resistor in the converter circuit and is compared with the modulation frequency in a phase detector to produce a control signal whose polarity is determined by the phase relationship of the compared signals. This control signal controls the oscillator to a frequency at which the transducer delivers maximum power to a load.

10 Claims, 3 Drawing Figures

INVENTOR.
LENNART RUNE BRANDQUIST
BY

AGENT

*INVENTOR.*
LENNART RUNE BRANDQUIST
BY
[signature]
AGENT

GENERATOR FOR PRODUCING ULTRASONIC OSCILLATIONS

This invention relates to a generator for producing ultrasonic oscillations, comprising a resonant circuit and a transducer coupled thereto, a direct current source, the output current of which is converted into an alternating current through two switches controlled by means of a controllable oscillator, and means for applying said alternating current to said resonant circuit whose output energy is transferred to said transducer.

Such ultrasonic generators are used, for example, in cleaning equipment wherein the transducer is connected to a vessel which is partly filled with a suitable liquid and wherein the articles to be cleaned are placed. In its operating condition the generator provides a current of given frequency which is transferred to the transducer, i.e., the member converting the electrical oscillations into mechanical oscillations. The frequency is then decisive for the energy which is provided by the transducer and this frequency is normally chosen to be such that this output energy is at a maximum. However, the frequency at which the output energy is at a maximum varies with the quantity of liquid contained in the vessel. In order to maintain the output energy at a maximum the frequency of the oscillator current must therefore be readapted to the mechanical properties of the vessel and its contents prevailing at any instant. This may be effected by manual control of the controllable oscillator every time such is needed. However, in that case it may happen that a variation in the optimum situation is not observed, that the adjustment of the exact frequency value is neglected or that an erroneous adjustment is chosen.

An object of the present invention is to provide a generator of the kind described in the preamble wherein the required frequency is adjusted automatically to match the load. According to the invention such a generator is provided for this purpose with a modulator arrangement connected to said switches and to said adjustable oscillator for modulating said alternating current and with a comparison device connected to said modulator arrangement and to a parallel resistor incorporated in the alternating current circuit. The comparison device provides an output signal varying with the sign of the derivative of the amplitude of the current as a function of the operation frequency. The generator also includes means for applying said output signal as a control signal to said controllable oscillator.

In order that the invention may be readily carried into effect, it will now be described in detail by way of example with reference to the accompanying diagrammatic drawings, in which.

Figure 1:
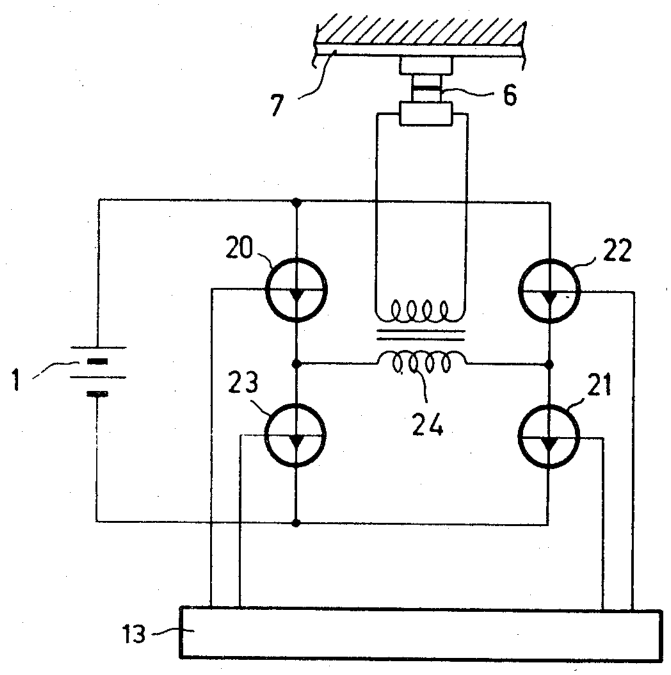
FIG. 1 shows a known embodiment of an ultrasonic generator.

In the known ultrasonic generator, as shown in FIG. 1, reference numeral 6 denotes a transducer which is connected to a vessel 7 containing a liquid. In the operating condition a current is applied to the transducer through the transformer 24. Before this current, which is derived from a direct voltage source 1, is applied to the transformer, it is converted into an alternating current with the aid of switches 20–23. The switches 20–23 are operated by a controllable oscillator 13 in a manner such that the current from the direct current source 1 is applied to the transformer alternately by the switches 20, 21 and 22, 23, respectively. The switches 20 – 23 are formed by power transistors in the embodiment shown.

An oscillator of the type shown in FIG. 1 has certain drawbacks. For example, the frequency of the oscillator current will have to be manually readjusted every time in order to maintain the maximum output energy when the level of the liquid in the vessel changes. Furthermore, the transistors require some time to change from the conducting into the non-conducting state so that the two transistor pairs are both conducting during part of each period of the operating current. The resultant periodically occurring short circuit of the output transformer results on the one hand in the current showing peaks and on the other hand it causes switching losses in the transistors which losses cannot be neglected. The occurrence of said peaks entails a limitation of the maximum current which may be interrupted by the transistor. The switching losses entail a limitation of the maximum frequency which may be assumed by the operating current because the period during which the two pairs of transistors are simultaneously conducting increases with frequency.

Figure 2:
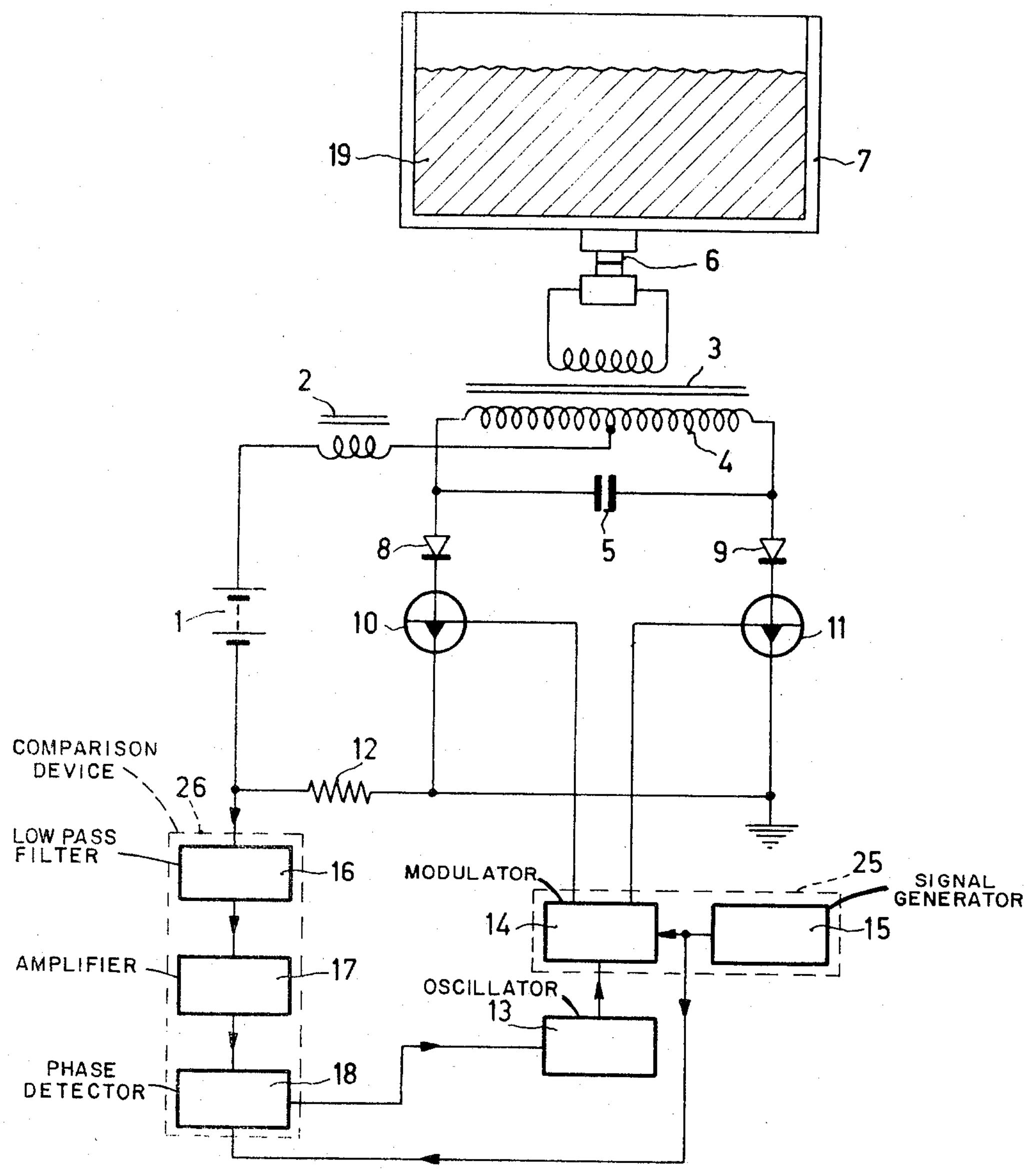
FIG. 2 shows an embodiment of an ultrasonic generator according to the invention.

The above-mentioned drawbacks are obviated in the ultrasonic generator according to the invention. FIG. 2 shows a possible embodiment. In this embodiment the reference numeral 1 denotes a direct current source the output current of which is applied through a choke coil 2 to a resonant circuit comprising a capacitor 5 and the primary winding 4 of a transformer 3. The inductance of the choke coil 2 is considerably higher than that of the primary winding of the transformer so that the current is substantially constant. The resonant circuit is tuned to the operating frequency. The current is chopped by switches each comprising the series arrangement of power transistors 10 and 11 and diodes 8 and 9, respectively. The diodes prevent a short-circuit current from flowing during the period when the two transistors are simultaneously conducting. The current flows alternately through the switches 8, 10 and 9, 11. For a suitably chosen Q-value of the tuned circuit the output voltage will be sinusoidal. It is of course alternatively possible to incorporate the secondary winding instead of the primary winding of the transformer in the tuned circuit. The transformer transfers the current to the transducer which converts the electrical oscillations into mechanical oscillations. The transducer 6 is connected to a vessel 7 containing a cleaning liquid 19 for cleaning articles immersed therein.

The transistors 10, 11 are operated by a switching signal from controllable oscillator 13. In accordance with the invention a particularly favourable and advantageous ultrasonic generator is obtained if the generator described is furthermore provided with a modulator arrangement 25 connected to said switching transistors 10, 11 and said controllable oscillator 13, which arrangement is used for modulating said alternating current, and a comparison device 26 connected to said modulator arrangement and to a parallel resistor 12 incorporated in the alternating current circuit. The comparison device provides an output signal varying with the sign of a so-called derivative signal which is applied as a control signal to the controllable oscillator 13. In the embodiment shown the modulator arrangement 25 is formed by a signal generator 15 of conventional design and a modulator 14, also of conventional design, wherein the output signal from the controllable oscillator 13 is modulated by the output signal from said signal generator 15. The modulation signal provided by said signal generator 15 has a frequency which is considerably lower than the frequency of the output signal from the controllable oscillator 13. When the frequency of this output signal is, for example, 20 kHz, it is possible to choose, for example, 50 Hz for the frequency of the modulation signal. The output signal from the signal generator is also applied as a reference signal to the comparison device 26. In the embodiment described this comparison device is formed by a phase sensitive detector 18 one of the input circuits of which is connected through an amplifier 17 and a lowpass filter 16 to the junction between resistor 12 and direct current source 1. The modulation signal selected with the aid of lowpass filter 16 is either in phase with or is out of phase with the modulation signal from signal generator 15. The modulation signal from filter 16 is compared in the phase detector, after amplification in the amplifier 17, with the modulation signal derived from the signal generator 15. The phase detector provides an output signal that is either positive or negative depending upon the phase relationship of the two input signals applied thereto. This output signal is applied as a control signal to the controllable oscillator 13.

Figure 3:
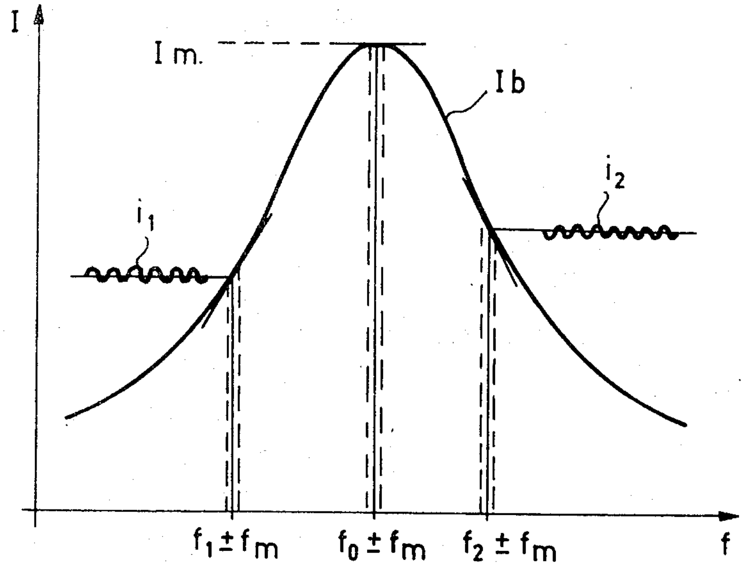
FIG. 3 shows the variation of the oscillator current as a function of the frequency of the control signal.

For further explanation reference is made to the curve shown in FIG. 3 which shows the variation of the operating current $I_b$ as a function of the frequency. When the power on the primary side of the transformer 3 is measured, this power may be represented by P = $U_b \cdot I_b$ wherein $U_b$ is constant and equal to the voltage of the direct current source and $I_b$ is the mean value of the direct current in the primary winding 4. As the output signal from the controllable oscillator is modulated in the modulator 14, the operating current will have an AC component whose amplitude and phase are dependent on the point on the curve I $(f)$ as determined by the frequency. When the arrangement operates on the point of the curve which corresponds to the frequency $f_o$, the differential coefficient of the current I obtained after differentiation will be equal to 0 and no AC component is obtained. The current has its maximum value on this point and hence the maximum power is provided at this frequency.

When the arrangement operates on the point corresponding to the frequency $f_1$ as a result of a variation in the level of the liquid, the frequency modulation by means of the modulation signal $\pm f_m$ results in an alternating current $i_1$ being obtained. This alternating current has a phase which is lagging with respect to the phase of the modulation signal. On the other hand, when the frequency has the value $f_2$, the modulation by means of the modulation signal $\pm f_m$ will produce an alternating current $i_2$ whose phase is leading with respect to the phase of the modulation signal. The currents $i_1$ and $i_2$ have the same frequency as the frequency modulation signal $f_m$. The alternating current signal thus occurring, for example, $i_1$ or $i_2$ is selected by means of lowpass filter 16, subsequently amplified in amplifier 17 and then applied to the phase detector 18. The modulation signal of the frequency $f_m$ provided by the signal generator 15 is also applied as a reference signal to this phase detector. The phase detector 18 provides a positive or a negative output voltage dependent upon whether the selcted AC signal is in phase or out of phase with the reference signal. This output voltage is applied to the controllable oscillator 13 so that the frequency of the output signal from this oscillator is increased or decreased towards the frequency $f_o$. When the oscillator frequency equals the frequency $f_o$, the output voltage of the phase detector is equal to zero. The operating current $I_b$ then has assumed its maximum value. The control loop described constitutes a negative feedback system which is adapted to adjust the frequency to a value at which the current is at a maximum. This value may be dependent upon the load on the transducer producing the mechanical oscillations, Thus, the system has no absolute reference which is particularly advantageous since the magnitude of the maximum value of the operating current is not known in advance. The control loop thus tends to adjust the oscillator tuning in a manner such that it provides the maximum power adapted to the load.

What is claimed is:

1. A generator for producing ultrasonic oscillations, comprising a resonant circuit and a transducer coupled thereto to receive the output energy thereof, a direct current source coupled in circuit to two switching devices controlled by means of a controllable oscillator so as to convert the DC current into an alternating current, means for applying said alternating current to said resonant circuit, means connected to said switching devices and to said controllable oscillator for modulating said alternating current, a comparison device connected to said modulating means and to a parallel resistor included in the alternating current circuit, said resistor deriving a signal that exhibits an amplitude response to the frequency variations which determines the sign of the derivative of the current with respect to the current frequency, said comparison device providing an output signal whose polarity is determined by the phase relationship between the signal derived across the resistor and the signal received from said modulating means, and means for applying said output signal as a control signal to said controllable oscillator thereby to vary the frequency thereof in a direction tending to optimize the energy transfer to the transducer.

2. A generator as claimed in claim 1 wherein said modulating means comprises a signal generator and a modulator, the output signal from the controllable oscillator being frequency modulated in said modulator by the output signal from the signal generator, and wherein said comparison device comprises a phase sensitive detector one input circuit of which is connected to the alternating current circuit and includes a lowpass filter for selecting the modulation signal component from said alternating current, means connecting the other input circuit of said detector to the output of the signal generator, and means connecting the output of said phase sensitive detector to said controllable oscillator to supply said output control signal thereto.

3. A generator as claimed in claim 2 wherein said resonant circuit is tuned to the nominal operating frequency of the controllable oscillator and said signal generator supplies a signal of a frequency that is lower than the operating frequency of the controllable oscillator.

4. An ultrasonic generator comprising, a source of DC current coupled to a DC to AC converter circuit that includes a resonant circuit, a resistor, and at least two controlled switching devices each with a control electrode coupled to the output of a frequency controllable oscillator, a transducer coupled to said resonant circuit, means interposed between the output of said oscillator and said control electrodes for modulating the output signal of the oscillator at a lower frequency than the oscillator frequency to produce across said resistor an amplitude response to the frequency variations with a signal component at said lower frequency, means coupled to said resistor for deriving an error control signal whose polarity is determined by the phase relationship of said signal component relative to the lower frequency modulating signal, and means for applying said control signal to the control input of said oscillator so as to vary the frequency thereof in a sense tending to null the error signal.

5. An ultrasonic generator as claimed in claim 4 wherein said error signal deriving means comprises a phase detector with a first input coupled to said resistor and a second input coupled to said signal modulating means to receive the modulation signal of said lower frequency, said phase detector producing an error signal of one polarity when the compared input signals thereto are in phase and of the opposite polarity when the compared input signals are in phase opposition, the frequency of said oscillator being either increased or decreased until the amplitude response of the circuit to the modulation frequency is zero.

6. An ultrasonic generator as claimed in claim 5 further comprising a filter connected between said resistor and said first input of the detector and tuned to pass signals of said lower frequency and to block the passage of signals of the oscillator frequency.

7. An ultrasonic generator as claimed in claim 5 wherein said signal modulating means comprises, a modulator having one input coupled to the output of the oscillator and an output coupled to the control electrodes of said switching devices, and a signal generator supplying a signal of said lower frequency to a second input of the modulator and to said second input of the phase detector.

8. An ultrasonic generator as claimed in claim 4 wherein said resonant circuit is tuned to the operating frequency of the controllable oscillator.

9. An ultrasonic generator as claimed in claim 8 wherein said resonant circuit comprises a transformer with a secondary winding coupled to the transducer and a primary winding coupled to said switching devices to form first and second series circuits across the DC source that includes said resistor in common and a first part of the primary winding and one switching device in the first series circuit and a second part of the primary winding and a second switching device in the second series circuit, and a capacitor connected in parallel with one of said transformer windings.

10. An ultrasonic generator as claimed in claim 9 further comprising an inductor connected in series in common with each of said first and second series circuits across the DC source, said inductor having an inductance that is much larger than the inductance of said primary winding, and first and second diodes individually connected in series with said switching means.

* * * * *

PO-1050
(5/69)

UNITED STATES PATENT OFFICE
CERTIFICATE OF CORRECTION

Patent No. 3842340 Dated October 15, 1974

Inventor(s) Lennart Rune Brandquist

It is certified that error appears in the above-identified patent and that said Letters Patent are hereby corrected as shown below:

ON THE TITLE PAGE

Section 75, "Rune Lennart Brandquist" should read "Lennart Rune Brandquist";

IN THE SPECIFICATIONS column 1, line 16, cancel "and wherein" and insert --into which--;

line 21, cancel "is then decisive for" and insert --will then control--;

line 23, cancel "to be";

column 2, line 11, cancel "every";

line 12, cancel "time";

line 13, cancel "when" and insert --each time--;

lines 23 & 25, change "of" to --on--;

column 3, line 45, cancel "differential coefficient" and insert --derivative--;

PO-1050
(5/69)

UNITED STATES PATENT OFFICE
CERTIFICATE OF CORRECTION

Patent No. 3842340 Dated October 15, 1974

Inventor(s) Lennart Rune Brandquist

It is certified that error appears in the above-identified patent and that said Letters Patent are hereby corrected as shown below:

column 3, lines 48 & 50, change "on" to --at--;

IN THE CLAIMS

CLAIM 10, line 7, cancel "means" and insert --devices--;

Signed and Sealed this

*twenty-sixth* Day of *August 1975*

[SEAL]

*Attest:*

RUTH C. MASON
*Attesting Officer*

C. MARSHALL DANN
*Commissioner of Patents and Trademarks*